US011273401B2

(12) United States Patent
Imdieke

(10) Patent No.: US 11,273,401 B2
(45) Date of Patent: Mar. 15, 2022

(54) PLENUM SEPARATOR

(71) Applicant: GEM EQUIPMENT OF OREGON, INC., Woodburn, OR (US)

(72) Inventor: Christopher Michael Imdieke, Molalla, OR (US)

(73) Assignee: GEM EQUIPMENT OF OREGON, INC., Woodburn, OR (US)

( * ) Notice: Subject to any disclaimer, the term of this patent is extended or adjusted under 35 U.S.C. 154(b) by 382 days.

(21) Appl. No.: 16/354,319

(22) Filed: Mar. 15, 2019

(65) Prior Publication Data

US 2019/0299140 A1  Oct. 3, 2019

Related U.S. Application Data

(60) Provisional application No. 62/649,727, filed on Mar. 29, 2018.

(51) Int. Cl.
*B01D 45/12* (2006.01)
*B01D 45/06* (2006.01)
*B01D 46/04* (2006.01)
*B01D 46/00* (2022.01)

(52) U.S. Cl.
CPC ......... *B01D 45/12* (2013.01); *B01D 46/0041* (2013.01); *B01D 46/04* (2013.01); *B01D 2258/0275* (2013.01)

(58) Field of Classification Search
CPC .... B01D 45/06; B01D 46/0041; B01D 46/04; B01D 2258/0275
See application file for complete search history.

(56) References Cited

U.S. PATENT DOCUMENTS

| | | | | |
|---|---|---|---|---|
| 3,271,117 A * | 9/1966 | Leatham | ................. | C22B 26/22 422/162 |
| 4,298,359 A * | 11/1981 | Keller | .................... | B01D 45/12 210/512.2 |
| 5,479,907 A * | 1/1996 | Walker, Jr. | ........... | F01M 13/023 123/198 E |
| 2014/0250625 A1* | 9/2014 | Huang | ................... | B01D 45/16 15/353 |

* cited by examiner

*Primary Examiner* — Jonathan Miller
*Assistant Examiner* — Gabriel E Gitman
(74) *Attorney, Agent, or Firm* — Schwabe, Williamson & Wyatt, P.C.

(57) ABSTRACT

Embodiments herein provide a plenum separator for removing excess oil from fried food items, and then separating the oil from an air/oil mixture. A system for feeding fried food items with excess oil thereon may extend across and above the width of the plenum. A sink may be disposed at a bottom of the plenum. A blower typically draws air from the second end of the pipe, causing the air/oil mixture to be drawn into the slot and through the inner channel, with at least a portion of the air in the air/oil mixture passing through the opening in the pipe, with at least a portion of the oil in the air/oil mixture falling to the sink, and with at least a portion of the air/oil mixture passing from the inner channel to the outer channel and through the elongated aperture to be recirculated through the inner channel.

25 Claims, 4 Drawing Sheets ent application claims priority to U.S. Provisional
PLENUM SEPARATOR

CROSS REFERENCE TO RELATED APPLICATIONS

The present application claims priority to U.S. Provisional Patent Application No. 62/649,727, filed Mar. 29, 2018, entitled "PLENUM SEPARATOR," the entire disclosure of which is incorporated by reference.

TECHNICAL FIELD

Embodiments herein relate to a plenum-type separator used for the separation of gas and other materials and, more specifically, to such a separator used to remove liquid from air.

BACKGROUND

There are many instances in which water and other liquids and materials need to be removed from a stream of air and other gasses. There are industrial settings where this is required and there are domestic situations where such functions need to be performed. Existing systems can perform this function but are often complex and expensive. The system of the present disclosure provides the stated purpose in an apparatus that is relatively inexpensive and can be used in a wide variety of settings.

One specific application of this technology addresses the removal of oil from air after the air passes through and over recently-fried food products like french fries, hash browns, potato slices and sausage patties. So-called cyclone separators, such as those manufactured by Reyco Systems, have attempted to address this issue but such systems are too large to be used in some applications.

BRIEF DESCRIPTION OF THE DRAWINGS

Embodiments will be readily understood by the following detailed description in conjunction with the accompanying drawings and the appended claims. Embodiments are illustrated by way of example and not by way of limitation in the figures of the accompanying drawings.

DETAILED DESCRIPTION OF DISCLOSED EMBODIMENTS

Figure 1:
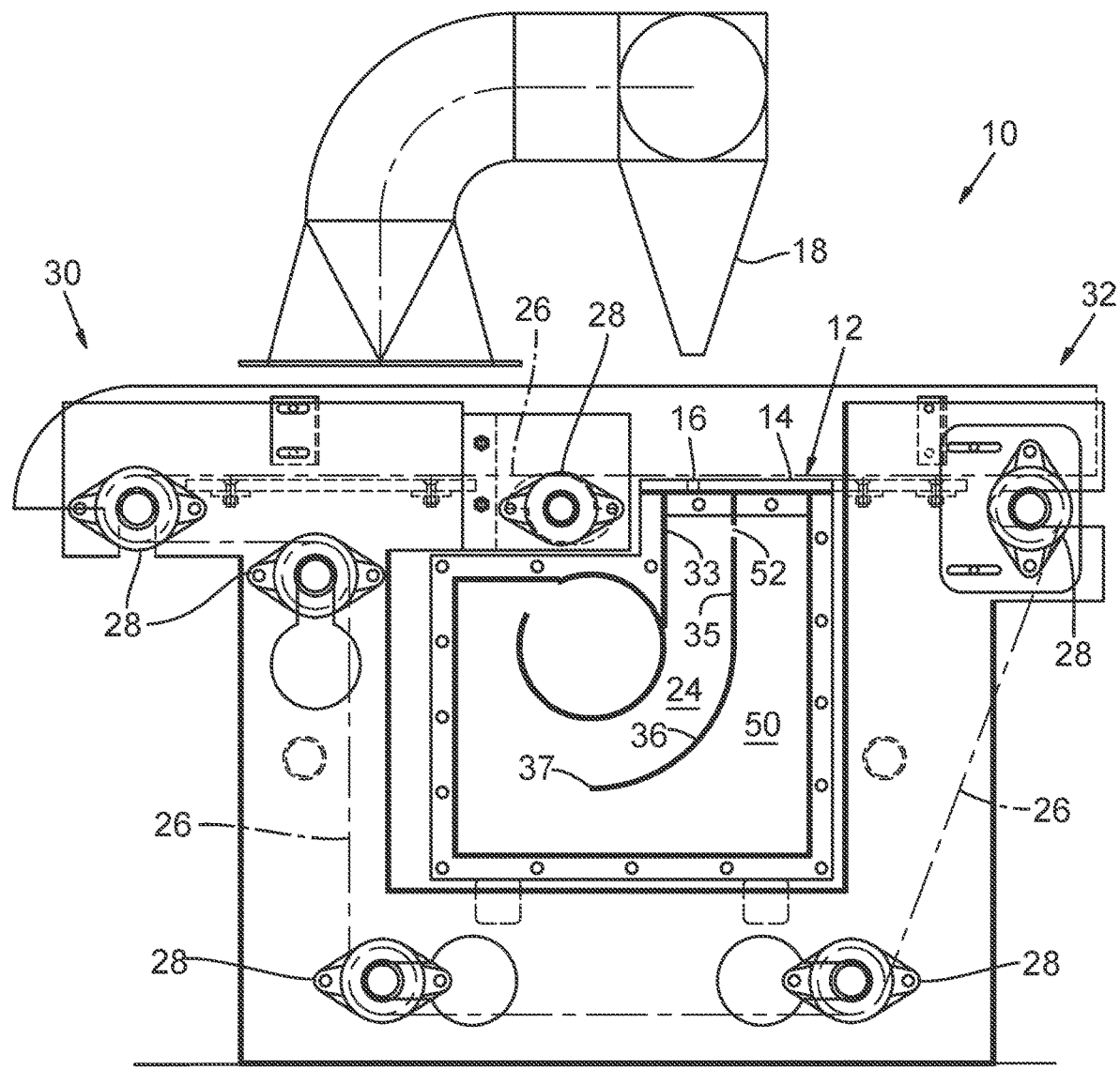
FIG. 1 is a front elevation view of an embodiment of the present disclosure, showing the entire separator plant.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense.

Various operations may be described as multiple discrete operations in turn, in a manner that may be helpful in understanding embodiments; however, the order of description should not be construed to imply that these operations are order-dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous, and are generally intended as "open" terms (e.g., the term "including" should be interpreted as "including but not limited to," the term "having" should be interpreted as "having at least," the term "includes" should be interpreted as "includes but is not limited to," etc.).

With respect to the use of any plural and/or singular terms herein, those having skill in the art can translate from the plural to the singular and/or from the singular to the plural as is appropriate to the context and/or application. The various singular/plural permutations may be expressly set forth herein for sake of clarity.

The depicted embodiment and the following description is specifically directed to the removal of cooking oil from air but is broader than that in that it can be used for the removal of any liquid or even solid particulate from a stream of a wide variety of gases.

Embodiments herein provide a plenum separator for removing excess oil from fried food items, and then separating the oil from an air/oil mixture. The separator may include a plenum defined by exterior walls, including a top wall with a slot therein, and having a width. An inner channel is typically disposed below the slot, the inner channel having a periphery defined by an exterior wall and an inner wall, the inner wall having a downwardly-extending portion and a curved portion, the curved portion having a turn of about 90 degrees defining a wall radius and terminating in an inner wall edge. A central pipe may be disposed within the plenum, generally above the inner wall edge, the central pipe having a pipe radius that is smaller than the wall radius, the pipe having an open portion extending substantially its entire length disposed at an upper quadrant thereof that faces away from the inner wall, the pipe being closed at a first end and open at a second end. An outer channel may be defined between the inner wall and another of the exterior walls, and an elongated aperture may be disposed in an upper portion of the inner wall, below and adjacent to the slot, the aperture partially interconnecting the outer and inner channels. A system for feeding fried food items with excess oil thereon, may extend across and above the width of the slot. A sink may be disposed at a bottom of the plenum. A blower typically draws air from the second end of the pipe, causing the air/oil mixture to be drawn into the slot and through the inner channel, with at least a portion of the air in the air/oil mixture passing through the opening in the pipe, with at least a portion of the oil in the air/oil mixture falling to the sink, and with at least a portion of the air/oil mixture passing from the inner channel to the outer channel and through the elongated aperture to be recirculated through the inner channel.

The slot and the elongated aperture are of normally of substantially the same length, and one or both may extend substantially the entire width of the plenum. The slot and the elongated aperture may also be substantially parallel.

The open portion of the pipe may be disposed between about 9 o'clock and 12 o'clock. The pipe may extend in a direction substantially parallel to the inner wall edge.

The wall radius may be about twice that of the pipe radius. The separator may also include a sink in a bottom of the plenum for collecting oil that is removed from the air/oil mixture. At least a portion of the inner and outer channels may extend in a substantially vertical direction. A distance between the pipe and the inner wall may be substantially the same as a distance between the inner wall edge and the sink. The pipe and the curved portion of the inner wall may be curved on the same axis of curvature. The blower may also discharge air through the feed belt. The system may be in the form of a continuous, porous feed belt or could even be simply a vibratory surface.

Other embodiments of the disclosure may provide a plenum separator for separating liquid or solid particulate from gas. These embodiments may include a plenum defined by exterior walls and having a width, the walls including a top wall with an opening therein. An inner channel may be disposed below the opening, the inner channel may be defined between an inner wall with a downwardly-extending portion and a curved portion having a wall radius with a wall axis of curvature, and the curved portion of the inner wall may terminate in a substantially horizontal wall edge. A central pipe may be disposed adjacent the inner channel and above the wall edge, the central pipe having a pipe radius that is smaller than the wall radius and a pipe axis of curvature that is coincident with the wall axis of curvature, the pipe having an open portion extending substantially its entire length disposed between about 9 o'clock and 12 o'clock, or even between about 10 o'clock and 11 o'clock, the pipe being closed at a first end and open at a second end. An outer channel may be defined between the inner wall and another of the exterior walls. An aperture, sometimes in the form of one or more slots, disposed in an upper portion of the inner wall, may partially connect the inner and outer channels. A blower may draw clean gas from the second end of the pipe, and then mix with particulate to be drawn as a gas/particulate mixture into the opening, through the inner channel, and through the aperture to recirculate the gas/particulate mixture.

The foregoing embodiments may include a continuous, porous feed belt for feeding material with excess particulate thereon, the feed belt extending under the air discharge and above the plenum. The slot may extend substantially the entire width of the plenum. The aperture may be an elongated aperture, disposed below and adjacent to the slot. The aperture may extend substantially the entire width of the plenum. The wall radius may be about twice that of the pipe radius. And the embodiments may also include a sink in a bottom of the plenum for collecting particulate that is removed from the gas/particulate mixture. A distance between the pipe and the inner wall may be substantially the same as a distance between the inner wall and the sink.

Figure 3:
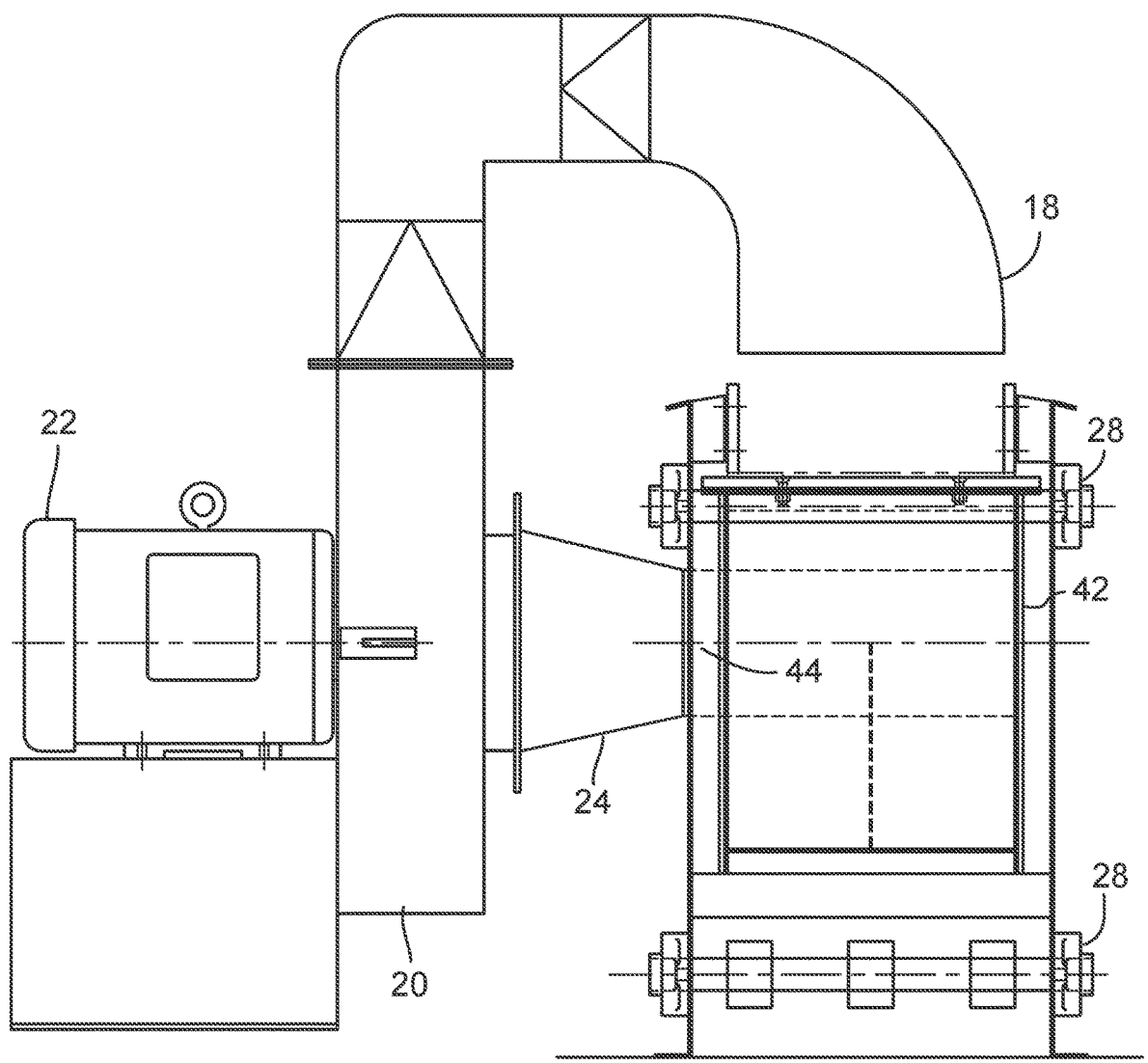
FIG. 3 is a side elevation view of the embodiment of FIG. 1, again showing the entire separator plant.
Figure 4:
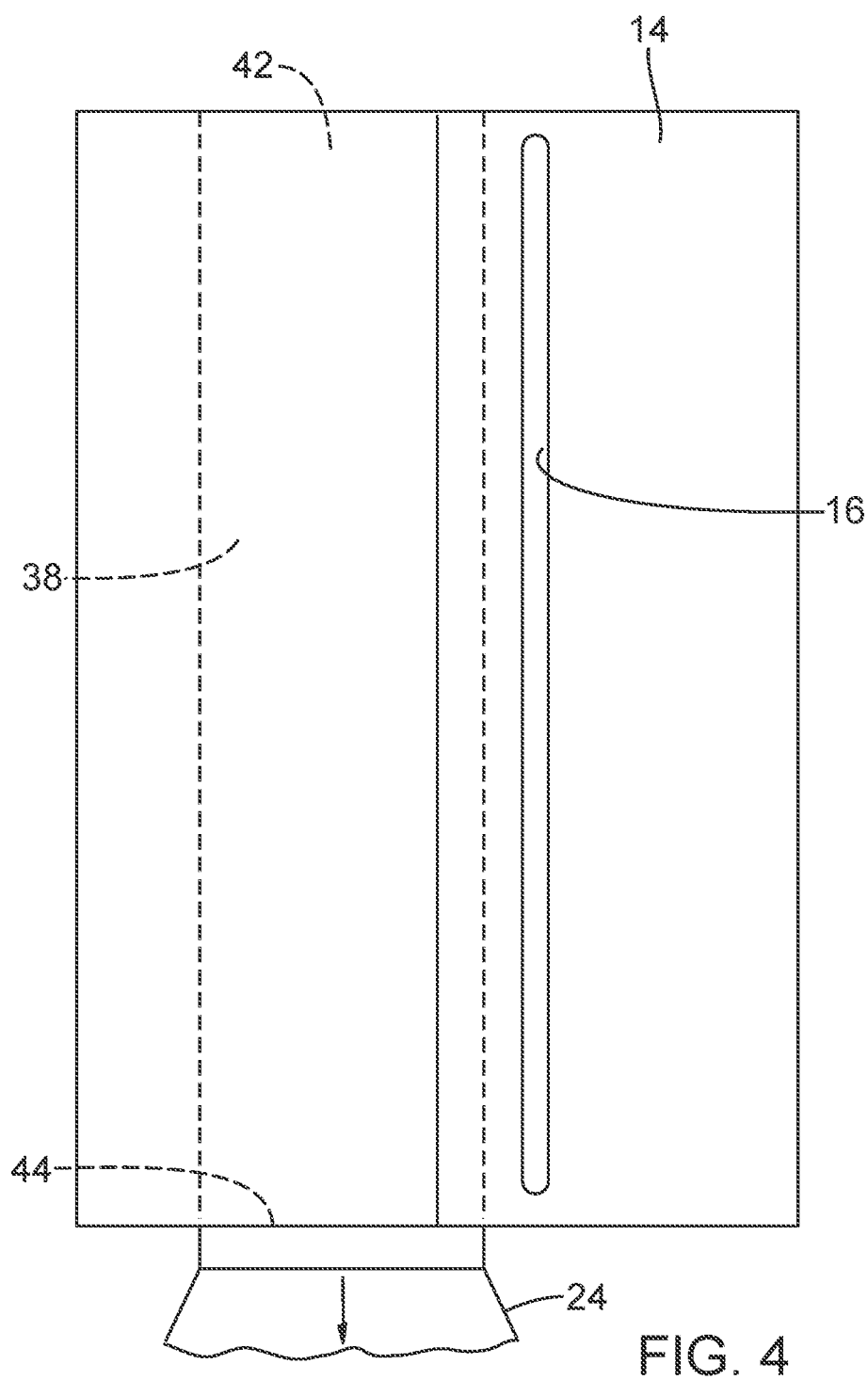
FIG. 4 is a top view of the plenum separator portion of the plant, showing the suction slot through which particulate/gas mixture enters the plenum.

As shown in the figures, the plenum separator system, identified generally with the numeral 10, includes exterior walls surrounding a plenum 12. A top plate 14 is disposed at the top of the plenum 12, the top plate having an opening, which may be in the form of a slot 16. Slot 16 may extend for substantially the entire width of the plenum (that is, at least 80%), as shown in FIGS. 3 and 4. The slot may be continuous as depicted or can be in the form of a plurality of slots formed across the plenum. A blower duct 18 receives air from fan 20 (see FIG. 3), which is driven by a fan motor 22. Fan 20 is typically a high volume design, with a capability of drawing/blowing around 14,000 cubic feet per minute. Air is drawn from plenum 12 through an intake duct 24, which in turn creates a suction through slot 16.

A system may be provided for feeding fried food items with excess oil thereon across and above the width of the slot. In FIG. 1, the system is depicted to be a continuous feed belt 26 that encircles plenum 12, and is guided by belt guides 28 disposed around the plenum. Feed belt 26 is usually formed of a porous metal pattern but it may be fabricated of plastic or other materials. It needs to be porous so air being drawn into slot 16 can pass through the belt and remove excess oil from the food product or other material resting on the belt. Typically all of the belt guides 28 are motor driven but it may be that fewer than all of the guides are driven and some simply idle with the moving feed belt 26. Feed belt 26 provides a relatively continuous flow of fried food products such as French fries (not shown) or other products that are fed onto feed belt 26 at an intake end 30 bearing excess cooking oil and are discharged at a discharge end 32 in a condition relatively free of excess oil. Alternatively, instead of a continuous, porous feed belt, the system could simply include a vibratory surface. The surface would extend across and above the width of the slot and would look the same as the depiction of the belt extending across the slot in FIG. 1 except that the remainder of the belt and the belt guides could be deleted.

Figure 2:
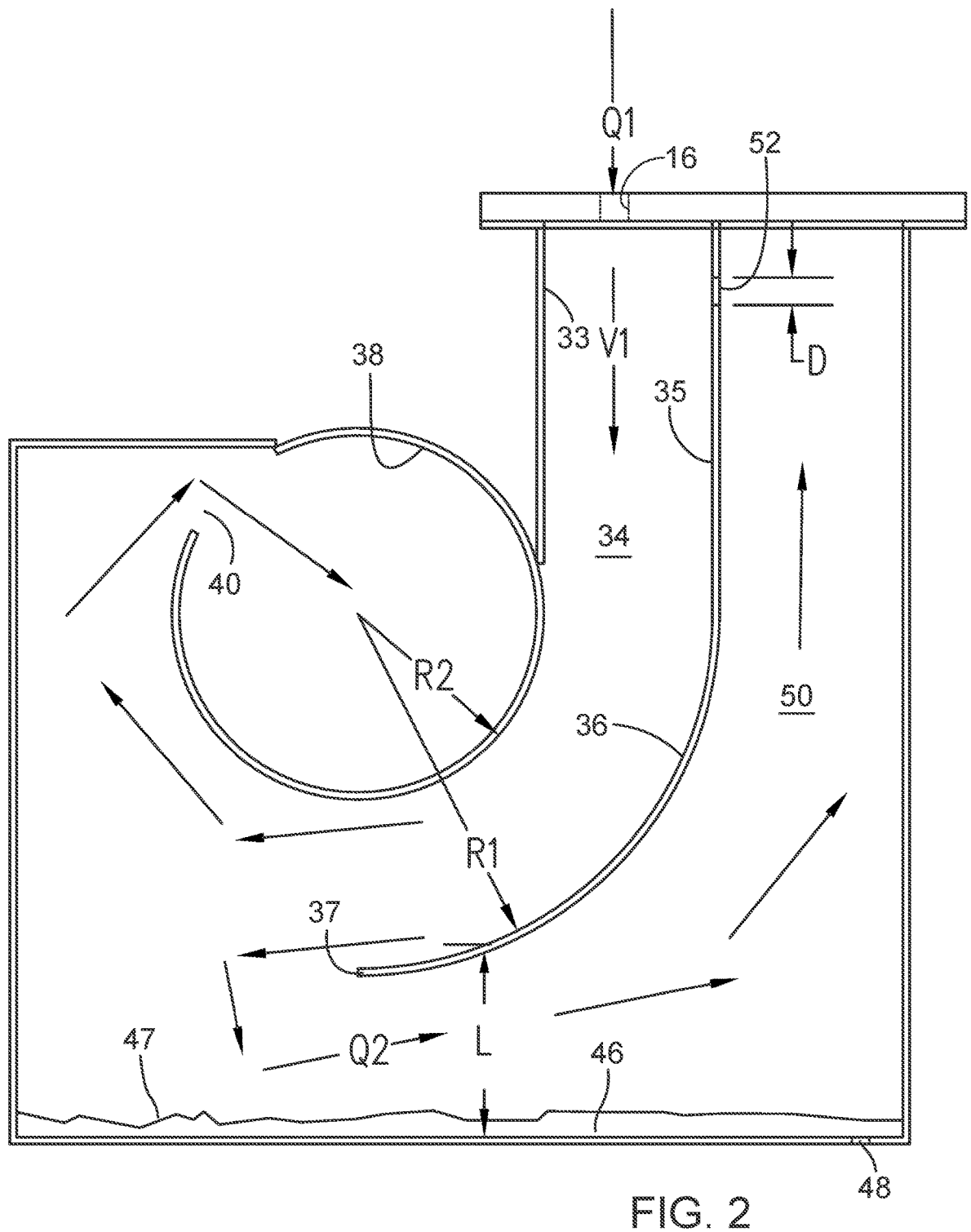
FIG. 2 is a front elevation view of the embodiment of FIG. 1 except that only the plenum separator portion of the entire separator plant is shown, depicting the flow of gas and particulate/gas mixture in the apparatus.

The air being drawn across feed belt 26 is typically traveling at a rate Q1 shown in FIG. 2. The air being drawn across the food-laden belt picks up oil, and the air/oil mixture is drawn through slot 16 and is accelerated due to the narrow dimension of the slot, entering an inner channel 34 at a velocity V1 (see FIG. 2). An inner channel 34 is defined between an exterior wall 33 and an inner wall 35, and has a straight, downwardly-extending portion, which then curves through a radius of about 90 degrees in a curved wall 36. The curvature of wall 36 is noted to be R1. The curvature causes a further acceleration, which, due to centrifugal force, causes the heavier liquids and solids to collect on curved wall 36. The curved wall thus acts as a type of impingement plate. The edge of curved wall 36 is identified at 37 and may extend generally horizontally.

The air, which is lighter than the oil or other liquid (or solid particulate), passes through the radius and is drawn upwardly into a centrally-dispose pipe 38. The pipe has a radius R2 and a linear opening 40 through which air is designed to be drawn. R2 is typically about half of R1; that is, the radius of curved wall 36. The curvature of pipe 38 may have the same axis of curvature of curved wall 36. Linear opening 40 may be disposed in an upper quadrant of pipe 38, facing away from inner channel. Another way to describe its position is between 9 o'clock and 12 o'clock, and preferably between about 10 o'clock and 11 o'clock. Pipe 38 may extend the entire width of plenum 12 and is sealed at a distal end 42 (see FIG. 3). The opposite, proximal end 44 of pipe 38 is connected with intake duct 24 of fan 20. By drawing air from pipe 38, a constant suction is maintained through intake duct 24, slot 16 and the entire plenum 12.

As noted earlier, the heavier oil or other liquid (or solid particulate) drops into the stream of air passing along the curved portion of inner channel 34, collecting on curved wall 36 and then dropping down to a sink 46 at the bottom of plenum 12. The oil or other liquid (or solid particulate) collects there until, in the case of liquids, they flow out of plenum 12 through drain 48.

Some air will invariably drop down from curved wall 36 with the liquid dropping off of curved wall 36. The dimension between curved wall 36 and sink 46 is noted in FIG. 2 as L, which, in the depicted embodiment, may be substantially the same as the difference in distance between R1 and R2, or approximately the same width as inner channel 34. This air is drawn upwardly at a volume Q2 (FIG. 2) in an outer channel 50 as result of the suction created by an elongated aperture 52 in inner wall 35, in a straight portion of the outer channel. Elongated aperture 52 thus extends between and partially connects inner channel 34 and outer channel 50. Elongated aperture 52 is typically small in its dimension, approximately 0.5 inch at D in FIG. 2, and typically extends across the entire width of the plenum. It can be seen in FIGS. 1 and 2 to be disposed adjacent slot 16, and may extend in a parallel direction and extend substantially across the entire plenum (again, at least 80%).

While small in its dimensions, elongated aperture 52 has a dramatic effect on the mixture of air and oil that is passing downwardly off of the end of curved wall 36. As noted earlier, much if not most of the liquid in this mixture may fall to sink 46 as shown at 47, and pass from the plenum through drain 48. However, the smallest droplets of liquid that have not been fully separated from the air are drawn upwardly into outer channel 50 as a result of the venturi created by elongated aperture 52. The suction in inner channel 34 causes the air/oil mixture to be drawn through elongated aperture 52 and back into inner channel 34. Here, the separation process described above is repeated until the liquid droplets become large enough to settle out of the air flow and drop into sink 46. Recirculation continues until the liquids (and/or solids) are entirely removed from the air stream.

Many features should be considered in constructing plenum 12. Slot 16 may be sized for approximately 15,000 fpm air velocity in order to create a pressure gradient between inner channel 34 and outer channel 50 of approximately 1.5 inches of water column. As noted above, elongated aperture 52 is sized for dimension D to be about 0.5 inches to allow approximately 10% of the main flow to be recirculated through outer channel 50 and back into inner channel 34. Distance L is sized to cause recirculated air velocity to be approximately 1000 feet per minute (or less) to allow droplets of oil, other liquid or particulate to settle into sink. R1 and R2 are sized in order to create adequate acceleration and time for heavier droplets and particles to drop from inner channel 34 adjacent curved wall 36 and its end edge 37 to sink 46.

Based on the recirculation volumetric flow rate, the depth of the sink 46 should be adequate to collect liquid before it passes out of the plenum through drain 48. The drain should be sized and shaped such that liquid can drain out without the low pressure in the plenum causing air to be drawn in through the drain 48. In certain applications it might be helpful to include a check valve (not shown) in the drain. In the event that particulate is being collected in sink 46, the particulate should be removed from time to time as necessary or some other collection system may be utilized.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein. Therefore, it is manifestly intended that embodiments be limited only by the claims and the equivalents thereof.

What is claimed is:

1. A plenum separator for removing excess oil from fried food items, and then separating the oil from an air/oil mixture, comprising:
    a plenum defined by exterior walls, including a top wall with a slot therein, and having a width;
    an inner channel disposed below the slot, the inner channel having a periphery defined by an exterior wall and an inner wall, the inner wall having a downwardly-extending portion and a curved portion, the curved portion having a turn of 90 degrees defining a wall radius and terminating in an inner wall edge;
    a central pipe disposed within the plenum, generally above the inner wall edge, the central pipe having a pipe radius that is smaller than the wall radius, the pipe having an open portion extending along substantially an entire length of the pipe that is disposed at an upper quadrant thereof that faces away from the inner wall, the pipe being closed at a first end and open at a second end;
    an outer channel defined between the inner wall and another of the exterior walls;
    an elongated aperture disposed in an upper portion of the inner wall, below and adjacent to the slot, the aperture partially interconnecting the outer channel and the inner channel;
    a system for feeding fried food items with excess oil thereon, extending across and above the width of the slot;
    a sink disposed at a bottom of the plenum; and
    a blower that draws air from the second end of the pipe, causing the air/oil mixture to be drawn into the slot and through the inner channel, with at least a portion of the air in the air/oil mixture passing through the opening in the pipe, with at least a portion of the oil in the air/oil mixture falling to the sink, and with at least a portion of the air/oil mixture passing from the inner channel to the outer channel and through the elongated aperture to be recirculated through the inner channel.

2. The plenum separator of claim 1, wherein the slot and the elongated aperture are of substantially the same length.

3. The plenum separator of claim 1, wherein the slot extends substantially the entire width of the plenum.

4. The plenum separator of claim 1, wherein the elongated aperture extends substantially the entire width of the plenum.

5. The plenum separator of claim 1, wherein the slot and the elongated aperture extend substantially the entire width of the plenum.

6. The plenum separator of claim 1, wherein the slot and the elongated aperture are substantially parallel.

7. The plenum separator of claim 1, wherein the open portion of the pipe is disposed on a circumferential wall of the pipe between 9 o'clock and 12 o'clock when the pipe is viewed end on from the first end of the pipe.

8. The plenum separator of claim 1, wherein the pipe extends in a direction substantially parallel to the inner wall edge.

9. The plenum separator of claim 1, wherein the wall radius is twice that of the pipe radius.

10. The plenum separator of claim 1, wherein the pipe and the curved portion of the inner wall are curved on the same axis of curvature.

11. The plenum separator of claim 1, further comprising a sink in a bottom of the plenum for collecting oil that is removed from the air/oil mixture.

12. The plenum separator of claim 1, wherein at least a portion of each of the inner channel and outer channel extends in a substantially vertical direction.

13. The plenum separator of claim 1, wherein a distance between the pipe and the inner wall is substantially the same as a distance between the inner wall and the sink.

14. The plenum separator of claim 1, wherein the blower discharges air through the feed belt.

15. The plenum separator of claim 1, wherein the system for feeding fried food items with excess oil thereon comprises a continuous, porous feed belt.

16. A plenum separator for separating liquid or solid particulate from gas, comprising:
   a plenum defined by exterior walls and having a width, the exterior walls including a top wall with an opening therein;
   an inner channel disposed below the opening, the inner channel defined between an exterior wall and an inner wall with a downwardly-extending portion and a curved portion having a wall radius with a wall axis of curvature, the curved portion of the inner wall terminating in a substantially horizontal wall edge;
   a central pipe disposed adjacent the inner channel and above the wall edge, the central pipe having a pipe radius that is smaller than the wall radius and a pipe axis of curvature that is coincident with the wall axis of curvature, the pipe having an open portion extending along substantially an entire length of the pipe that is disposed on a circumferential wall of the pipe between 9 o'clock and 12 o'clock when the pipe is viewed end on from a first end of the pipe, the pipe being closed at the first end and open at a second end;
   an outer channel defined between the inner wall and one of the exterior walls;
   an aperture disposed in an upper portion of the inner wall, partially connecting the inner channel and the outer channel; and
   a blower that draws gas from the second end of the pipe, and that causes a gas/particulate mixture to be drawn into the opening, through the inner channel, and through the aperture to recirculate the gas/particulate mixture.

17. The plenum separator of claim 16, further comprising a continuous, porous feed belt for feeding material with excess particulate thereon, the feed belt extending under an air discharge and above the plenum.

18. The plenum separator of claim 16, wherein the opening comprises a slot extending substantially the entire width of the plenum.

19. The plenum separator of claim 18, wherein the aperture is an elongated aperture, disposed below and adjacent to the slot.

20. The plenum separator of claim 16, wherein the aperture extends substantially the entire width of the plenum.

21. The plenum separator of claim 16, wherein the open portion of the pipe is disposed on a circumferential wall of the pipe between 10 o'clock and 11 o'clock when the pipe is viewed end on from the first end of the pipe.

22. The plenum separator of claim 16, wherein the wall radius is twice that of the pipe radius.

23. The plenum separator of claim 16, further comprising a sink in a bottom of the plenum for collecting particulate that is removed from the gas/particulate mixture.

24. The plenum separator of claim 16, wherein a distance between the pipe and the inner wall is substantially the same as a distance between the inner wall edge and the sink.

25. The plenum separator of claim 15, wherein the blower discharges air through the feed belt.

* * * * *